(12) United States Patent
Chen

(10) Patent No.: US 6,890,040 B2
(45) Date of Patent: May 10, 2005

(54) WHEEL HAVING DETACHABLY SECURING SPOKES

(76) Inventor: Yi Sheng Chen, P.O. Box 65-45, Taichung (TW), 403

(*) Notice: Subject to any disclaimer, the term of this patent is extended or adjusted under 35 U.S.C. 154(b) by 0 days.

(21) Appl. No.: 10/673,298

(22) Filed: Sep. 27, 2003

(65) Prior Publication Data
US 2004/0251734 A1 Dec. 16, 2004

(30) Foreign Application Priority Data
Jun. 10, 2003 (TW) .................... 92210600 U

(51) Int. Cl.⁷ .................. B60B 1/14; B60B 9/26
(52) U.S. Cl. .............. 301/58; 301/104; 301/95.104
(58) Field of Search .............. 301/55, 58, 104, 301/95.101, 95.104, 95.106, 110.5; 29/894.33, 894.331, 894.332, 894.333; 411/337, 336.1, 395, 548

(56) References Cited

U.S. PATENT DOCUMENTS

| | | | | |
|---|---|---|---|---|
| 309,566 A | * | 12/1884 | Schad et al. | 301/58 |
| 382,658 A | * | 5/1888 | Nickerson | 301/95.105 |
| 1,280,646 A | * | 10/1918 | Billhartz | 301/58 |
| 2,994,559 A | | 8/1961 | Carlson et al. | |
| 5,806,935 A | * | 9/1998 | Shermeister | 301/58 |
| 6,048,035 A | * | 4/2000 | Chen | 301/30 |
| 6,234,580 B1 | * | 5/2001 | Muraoka et al. | 301/58 |
| 6,588,852 B2 | * | 7/2003 | Mason | 301/37.41 |
| 6,776,460 B1 | * | 8/2004 | Lo | 301/58 |
| 6,811,228 B2 | * | 11/2004 | Tien | 301/58 |
| 2003/0209936 A1 | * | 11/2003 | Chen | 301/58 |
| 2004/0100142 A1 | * | 5/2004 | Meggiolan et al. | 301/58 |

* cited by examiner

Primary Examiner—Russell D. Stormer
Assistant Examiner—Jason R. Bellinger
(74) Attorney, Agent, or Firm—Charles E. Baxley

(57) ABSTRACT

A wheel includes a wheel rim having a number of orifices defined by one or more flanges for threading with spokes. A number of latches are attached to the spokes, and each includes a base having a shape for engaging through the orifices of the wheel rim. Each of the latches includes a catch disposed on the base, and also engageable through the orifices of the wheel rim, and having one or more cut off portions to form one or more tongues in the base. The catches are engageable into the orifices of the wheel rim when rotated relative to the wheel rim, to engage the tongue of the base with the inner surface of the wheel rim, and thus to anchor the latch to the wheel rim.

1 Claim, 6 Drawing Sheets

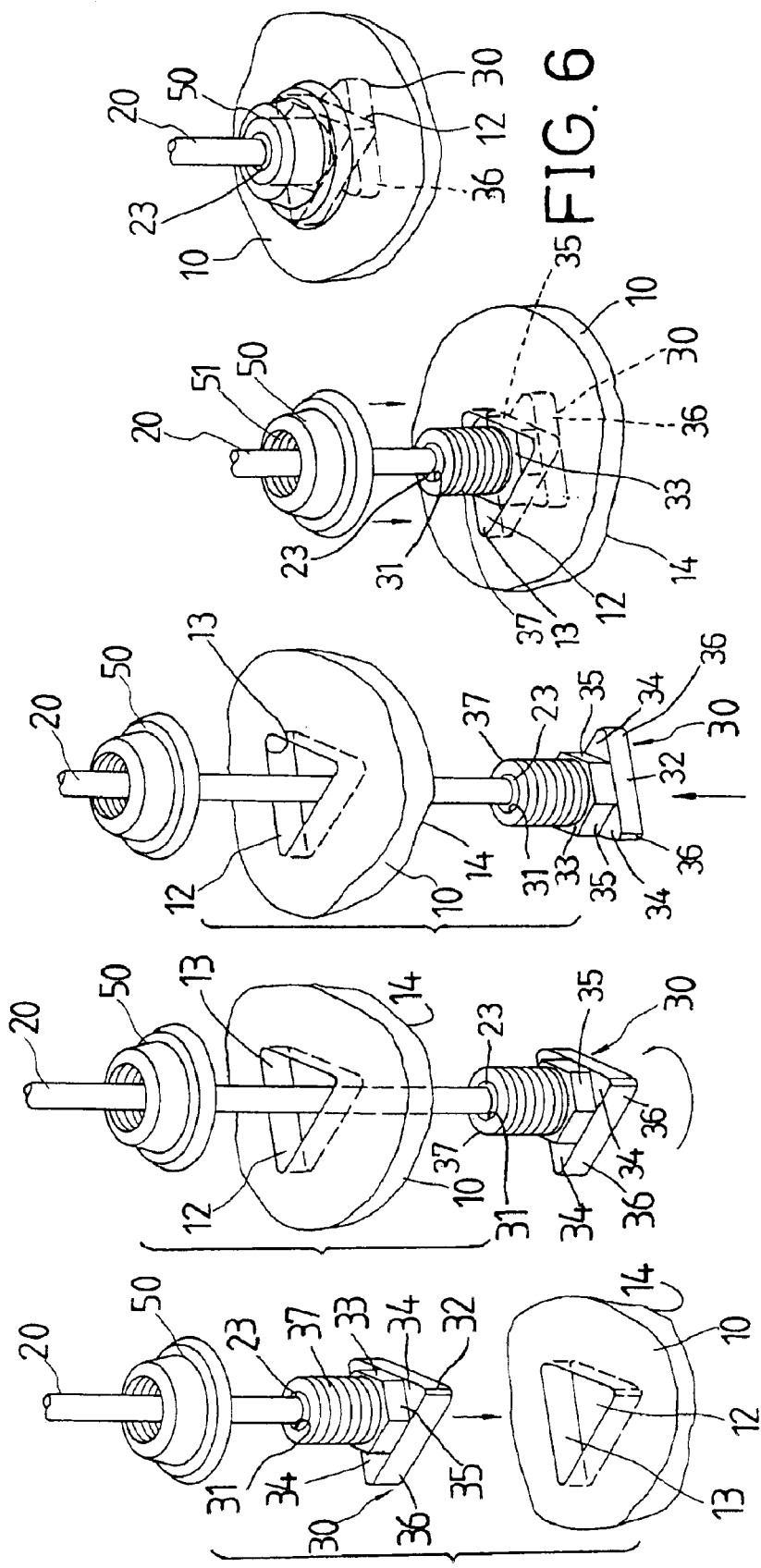

WHEEL HAVING DETACHABLY SECURING SPOKES

BACKGROUND OF THE INVENTION

1. Field of the Invention

The present invention relates to a wheel, and more particularly to a wheel including a number of spokes that may be detachably secured to the wheel rim of the wheel.

2. Description of the Prior Art

Typical wheels comprise a wheel rim and a number of spokes threaded through the wheel rim, for securing the wheel rim to a hub member which will then be attached to a wheel axle.

For example, U.S. Pat. No. 2,994,559 to Carlson et al. discloses one of the typical wheels and also comprises a number of spokes to be threaded through the wheel rim, for securing the wheel rim to the hub member.

Normally, the wheel rim includes a number of orifices formed therein, and each of the longitudinal spokes includes an enlarged head formed on one end thereof, for engaging and anchoring or securing the longitudinal spokes to the wheel rim, after the longitudinal spokes have been engaged through the orifices of the wheel rim.

However, the spokes include a longitudinal structure that may not be easily engaged or threaded through the orifices of the wheel rim, such that the workers or the users have to spend a lot of time to engage or to thread the longitudinal spokes through the orifices of the wheel rim.

The present invention has arisen to mitigate and/or obviate the afore-described disadvantages of the conventional spokes for wheels.

SUMMARY OF THE INVENTION

The primary objective of the present invention is to provide a wheel including a number of spokes that may be detachably secured to the wheel rim of the wheel, for allowing the spokes to be easily secured or assembled into the wheel rim of the wheel.

In accordance with one aspect of the invention, there is provided a wheel comprising a wheel rim including a plurality of orifices formed therein, and including an inner surface, and each of the orifices of the wheel rim being defined by at least one engaging flange, a plurality of spokes to be attached to the wheel rim, a plurality of latches each including a bore formed therein to receive the spokes respectively, and to be attached to the spokes respectively. Each of the latches includes a base having a shape corresponding to that of the orifices of the wheel rim, for allowing the base of the latch to be engaged through the orifices of the wheel rim. Each of the latches further includes a catch disposed on the base, and having an outer peripheral contour no greater than that of the base, to allow the catch to be engaged through the orifices of the wheel rim, and each of the catches includes at least one cut off portion formed therein, to define at least one engaging surface therein, and to form at least one tongue in the base relative to the catch. The catches are engageable into the orifices of the wheel rim when the catches of the latches are rotated relative to the wheel rim, to engage the engaging flange of the wheel rim into the cut off portion of the catches, and to engage the tongue of the base with the inner surface of the wheel rim, and thus to anchor the base of the latch to the wheel rim.

Each of the latches includes a first fastener extended from the catch, and a second fastener threaded to the first fastener and engaged with the wheel rim, to secure the latch to the wheel rim.

Each of the spokes includes a barrel secured thereto and engaged into the bores of the latches respectively.

Each of the barrels includes a screw hole formed therein, each of the spokes includes a threaded end portion for threading with the screw hole of the barrels, and for securing the barrels to the spokes respectively.

Each of the barrels includes an enlarged head formed thereon, for engaging with the latches and for anchoring the spokes to the latches respectively.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a partial exploded view illustrating the wheel spoke securing structure for the wheel;

FIGS. 3, 4, 5, 6 are partial perspective views illustrating the assembling operation of the wheel spokes to the wheel rim;

DETAILED DESCRIPTION OF THE PREFERRED EMBODIMENTS

Figure 1:
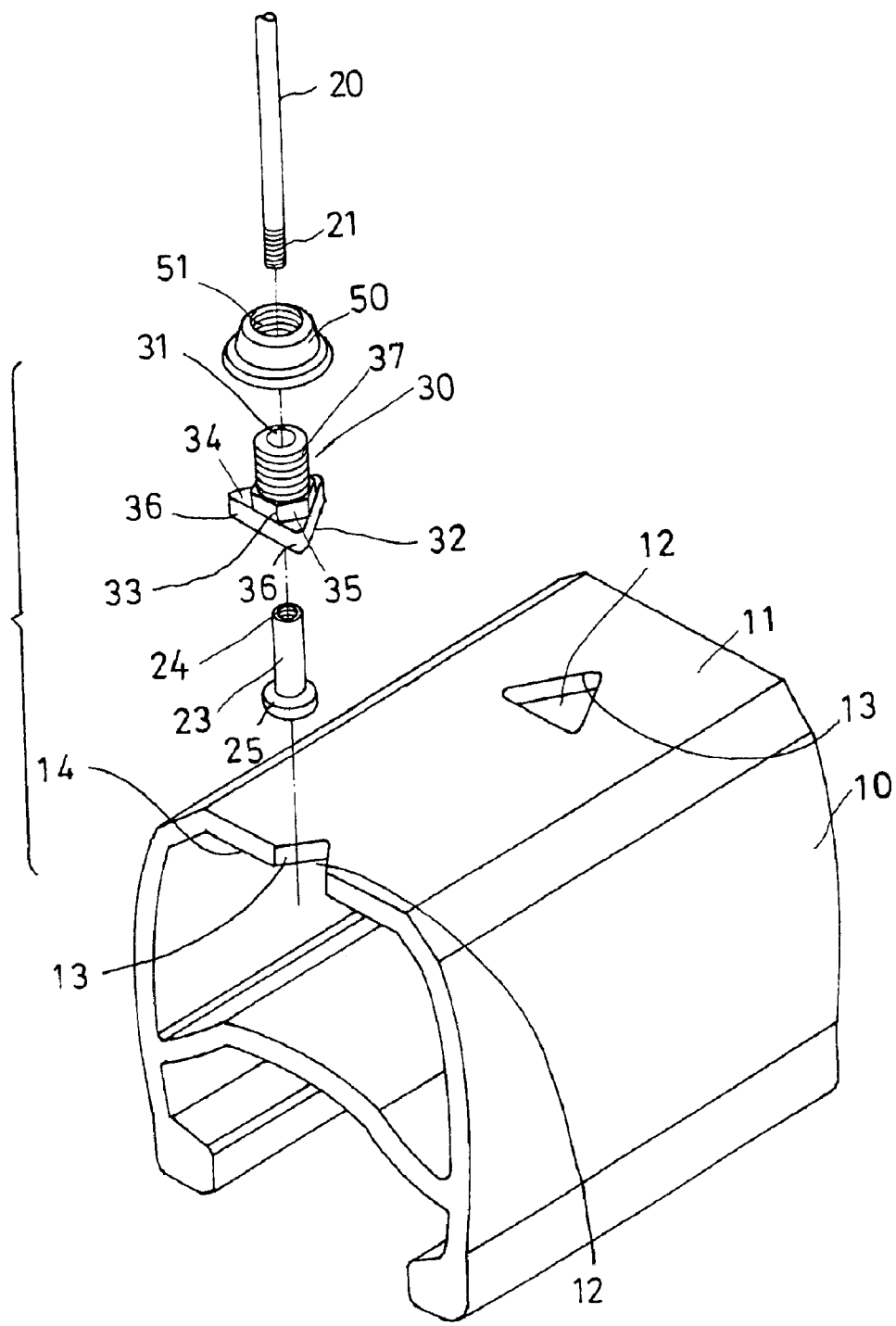
FIG. 1 is a partial exploded view of a wheel in accordance with the present invention.
Figure 7:
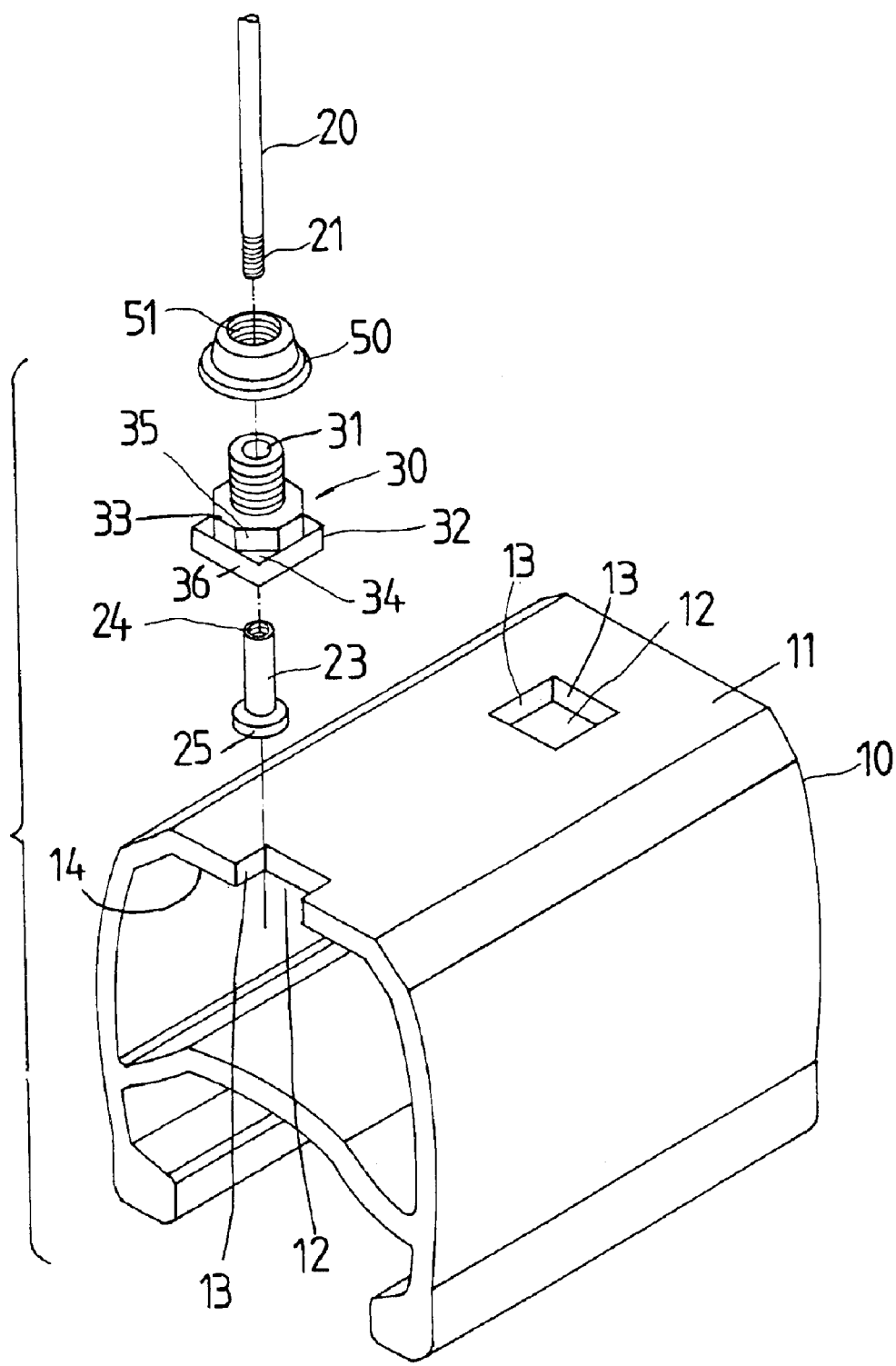
FIG. 7 is a partial exploded view similar to FIG. 1, illustrating the other embodiment of the wheel.
Figure 12:
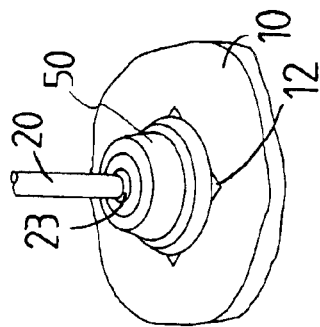
FIGS. 9, 10, 11, 12 are partial perspective views illustrating the assembling operation of the wheel spokes to the wheel rim as shown in FIGS. 7 and 8.
Figure 11:
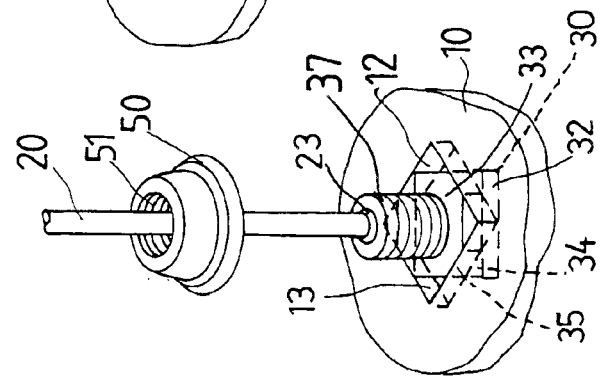
Figure 10:
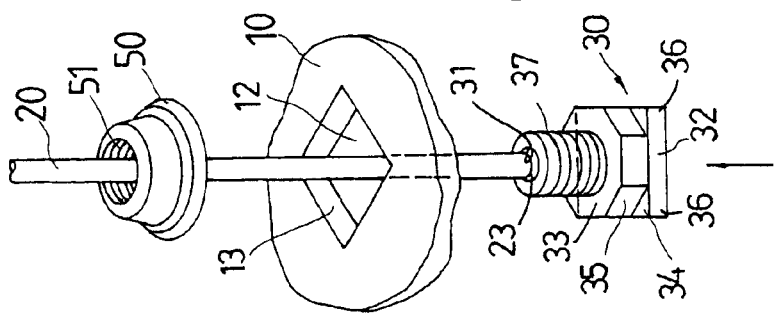
Figure 9:
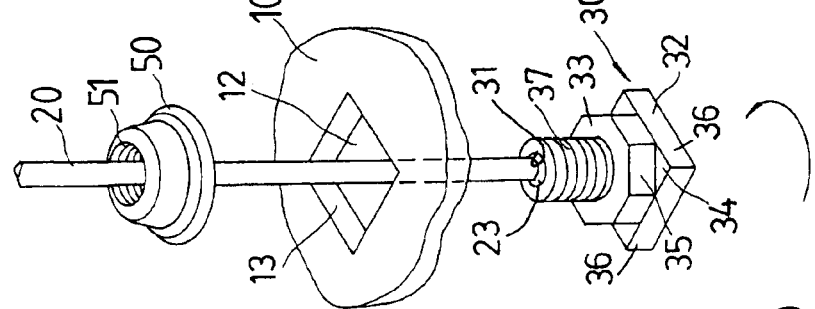
Figure 8:
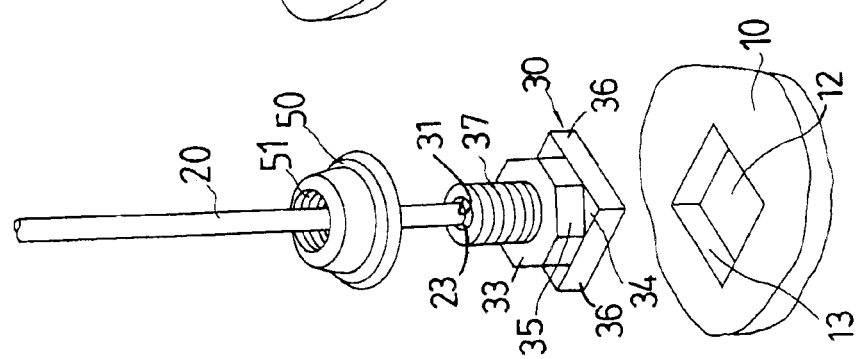
FIG. 8 is a partial exploded view illustrating the wheel spoke securing structure for the wheel as shown in FIG. 7.
Figure 14:
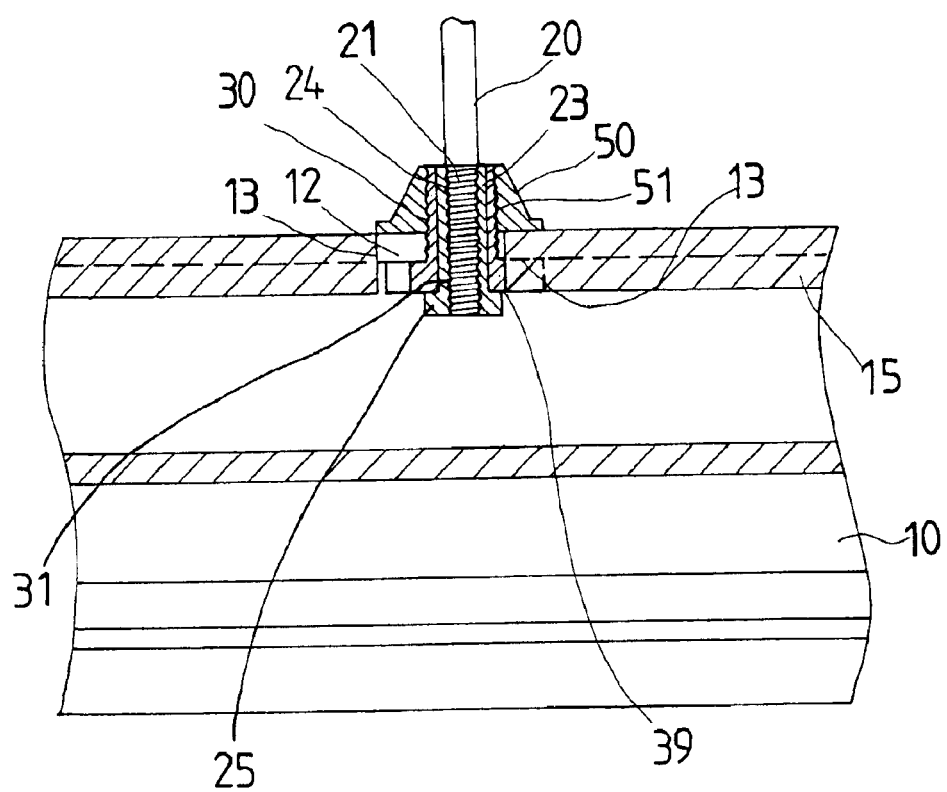
FIG. 14 is a partial cross sectional view of the wheel as shown in FIG. 13.

Referring to the drawings, and initially to FIGS. 1 and 2, a wheel in accordance with the present invention comprises a wheel rim 10 and a number or wheel spokes 20 to be attached to the wheel rim 10. Each of the spokes 20 includes a threaded end portion 21 for threading and securing to a screw hole 24 of a barrel 23 (FIG. 14). The barrel 23 may also be solidly formed or secured to the spoke 20 as an integral piece, as that of the typical spokes.

Figure 13:
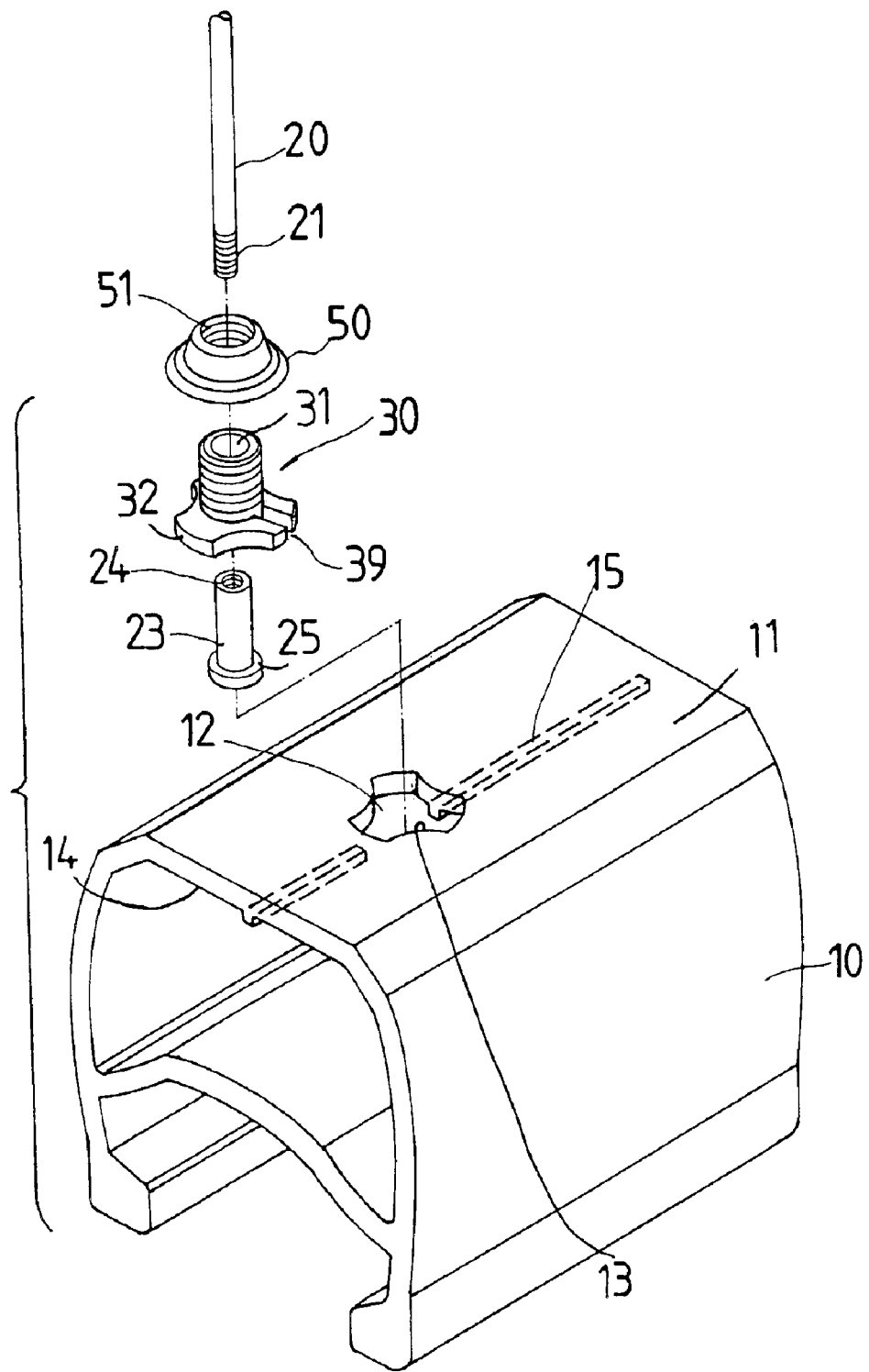
FIG. 13 is a partial exploded view similar to FIGS. 1 and 7, illustrating a further embodiment of the wheel.

The wheel rim 10 includes an inner peripheral surface 11 having a number of spaced orifices 12 formed therein and defined by three or more engaging surfaces or flanges 13. For example, the orifices 12 of the wheel rim 10 may include a triangular structure (FIGS. 1–6), a square or rectangular structure (FIGS. 7–12), or the other shaped structure (FIGS. 13, 14).

A number of latches 30 each includes a bore 31 formed therein for receiving the spoke 20 or the barrel 23 (FIG. 14) which includes an outer diameter no greater than the inner diameter of the bore 31 of the latch 30, for allowing the spoke 20 or the barrel 23 to be threaded or engaged through the bore 31 of the latch 30. The spoke 20 or the barrel 23 includes an enlarged head 25 having an outer diameter greater than the inner diameter of the bore 31 of the latch 30, for securing or anchoring the spoke 20 or the barrel 23 to the wheel rim 10 (FIG. 14).

Each of the latches 30 includes a base 32 having a shape corresponding to that of the orifices 12 of the wheel rim 10, for allowing the base 32 to be engaged through the orifices 12 of the wheel rim 10. For example, the base 32 of the latch 30 may include a triangular structure (FIGS. 1–6), a square or rectangular structure (FIGS. 7–12), or the other shaped structure (FIGS. 13, 14), for engaging through the corresponding orifices 12 of the wheel rim 10.

Each of the latches 30 includes a catch 33 formed or provided or disposed on the base 32, and having an outer peripheral contour no greater than that of the base 32, for allowing the catch 33 to be engaged through the orifices 12 of the wheel rim 10. The catch 33 includes one or more cut off portions 34 formed therein, to form or define one or more engaging surfaces 35 therein, and to form or define one or more projections or tongues 36 in the base 32 relatively.

When the catch 33 of the latch 30 is rotated relative to the wheel rim 10 for an angle, the cut off portions 34 of the catch 33 may be used to receive the flanges 13 of the wheel rim 10, for allowing the catch 33 to be engaged into the orifices 12 of the wheel rim 10. The engaging surfaces 35 of the catch 33 are arranged to be engaged with the flanges 13 of the wheel rim 10, for positioning or anchoring the catch 33 in the orifices 12 of the wheel rim 10, and for preventing the catch 33 and the latch 30 from being rotated relative to the wheel rim 10.

For example, as shown in FIGS. 1–6, the latch 30 is required to be rotated relative to the wheel rim 10 for 120 degrees, to allow the catch 33 to be engaged into the orifices 12 of the wheel rim 10. As shown in FIGS. 7–12, the latch 30 is required to be rotated relative to the wheel rim 10 for 90 degrees, to allow the catch 33 to be engaged into the orifices 12 of the wheel rim 10. It is preferable that the catch 33 includes a thickness no greater than the thickness of the wheel rim 10, for allowing the catch 33 to be received within the orifices 12 of the wheel rim 10.

After the latch 30 has been rotated relative to the wheel rim 10 to allow the catch 33 of the latch 30 to be engaged into the orifices 12 of the wheel rim 10, from FIG. 3 to FIG. 4, the projections or tongues 36 of the base 32 of the latch 30 may be engaged with the bottom or inner surface 14 of the wheel rim 10 (FIGS. 5, 6, 11), in order to position or secure or anchor the latch 30 to the wheel rim 10, and so as to prevent the latch 30 from being disengaged from the wheel rim 10.

Each of the latches 30 includes a threaded portion or a fastener 37 formed or provided on the catch 33, and having an outer peripheral contour no greater than that of the base 32 and the catch 33, for allowing the fastener 37 also to be engaged into the orifices 12 of the wheel rim 10. A lock nut or another fastener 50 includes an inner thread 51 formed therein for threading with the fastener 37 (FIGS. 5, 11), and engageable with the wheel rim 10 (FIGS. 6, 12), for securing the latch 30 to the wheel rim 10.

Alternatively, as shown in FIGS. 13, 14, the wheel rim 10 may include one or more ribs 15 extended from the bottom or inner surface 14 thereof, and the latch 30 may include one or more grooves 39 formed in the base 32, for receiving the ribs 15, after the latch 30 has been rotated relative to the wheel rim 10, in order to position or secure or anchor the latch 30 to the wheel rim 10.

It is to be noted that the latch 30 and the barrel 23 may first be engaged onto or secured to the spoke 20, before the latch 30 is engaged through the orifices 12 of the wheel rim 10. The lock nut or the fastener 50 may be selectively threaded with the fastener 37 of the latch 30, such that the spokes 20 may be easily and detachably secured to the wheel rim 10 with the latch 30 and/or the fastener 50.

Accordingly, the wheel in accordance with the present invention includes a number of spokes that may be detachably secured to the wheel rim of the wheel, for allowing the spokes to be easily secured or assembled into the wheel rim of the wheel.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheel comprising:

a wheel rim including a plurality of orifices formed therein, and including an inner surface, and each of said orifices of said wheel rim being defined by at least one engaging flange, a plurality of spokes to be attached to said wheel rim, each of said spokes including a threaded end portion, a plurality of latches each including a bore formed therein to receive said spokes respectively, and to be attached to said spokes respectively, a plurality of barrels engaged into said bores of said latches respectively, and each including a screw hole formed therein for threading with said threaded end portions of said spokes, and for securing said barrels to said spokes respectively, each of said barrels including an enlarged head formed thereon, for engaging with said latches and for anchoring said spokes to said latches respectively, each of said latches including a base having a shape corresponding to that of said orifices of said wheel rim, for allowing said base of said latch to be engaged through said orifices of said wheel rim, each of said latches further including a catch disposed on said base, and having an outer peripheral contour no greater than that of said base, to allow said catch to be engaged through said orifices of said wheel rim, each of said latches including a first fastener extended from said catch, a second fastener threaded to said first fastener and engaged with said wheel rim, to secure said latch to said wheel rim, each of said catches including at least one cut off portion formed therein, to define at least one engaging surface therein, and to form at least one tongue in said base relative to said catch, said catches being engageable into said orifices of said wheel rim when said catches of said latches are rotated relative to said wheel rim, to engage said at least one engaging flange of said wheel rim into said at least one cut off portion of said catches, and to engage said at least one tongue of said base with said inner surface of said wheel rim, and thus to anchor said base of said latch to said wheel rim.

* * * * *